US010747214B2

(12) United States Patent
Florentino et al.

(10) Patent No.: US 10,747,214 B2
(45) Date of Patent: Aug. 18, 2020

(54) HVAC SYSTEM INCLUDING ACTIVE SENSOR NETWORK CALIBRATION

(71) Applicant: Carrier Corporation, Jupiter, FL (US)

(72) Inventors: Blanca Florentino, Cork (IE); Alie El-Din Mady, Cork (IE); Kushal Mukherjee, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 610 days.

(21) Appl. No.: 15/518,109

(22) PCT Filed: Oct. 8, 2015

(86) PCT No.: PCT/US2015/054591
§ 371 (c)(1),
(2) Date: Apr. 10, 2017

(87) PCT Pub. No.: WO2016/057737
PCT Pub. Date: Apr. 14, 2016

(65) Prior Publication Data
US 2017/0300045 A1    Oct. 19, 2017

Related U.S. Application Data

(60) Provisional application No. 62/062,386, filed on Oct. 10, 2014.

(51) Int. Cl.
G05B 23/02    (2006.01)
G01N 27/416    (2006.01)
(52) U.S. Cl.
CPC ....... G05B 23/0221 (2013.01); G01N 27/416 (2013.01); G05B 2219/37008 (2013.01); G05B 2219/39058 (2013.01)

(58) Field of Classification Search
CPC ...... G05B 23/0221; G05B 2219/37008; G05B 2219/39058; G01N 27/416
(Continued)

(56) References Cited

U.S. PATENT DOCUMENTS 4,947,355 A    8/1990    Koeman
5,479,812 A    1/1996    Juntunen et al.
(Continued)

FOREIGN PATENT DOCUMENTS

CN    102393882 A    3/2012
EP    0230712 A1    8/1987
(Continued)

OTHER PUBLICATIONS

Search report from STIC (Year: 2019).*
(Continued)

Primary Examiner — Michael P Nghiem
Assistant Examiner — Dacthang P Ngo
(74) Attorney, Agent, or Firm — Cantor Colburn LLP

(57) ABSTRACT

An active sensor calibration system includes a plurality of sensors configured to measure at least one physical quantity. Each sensor is configured to output a signal indicating at least one measured physical quantity. An electronic scenario library module is configured to store a plurality of scenarios. Each scenario is configured to excite two or more selected sensors among the plurality of sensors to generate redundancy among the selected sensors based on physical quantity models. An electronic calibration module is in signal communication with the plurality of sensors and the scenario library. The calibration module is configured to select at least one scenario from the scenario library module, determine at least one possible un-calibrated sensor among the
(Continued)

plurality of sensors, and to identify a positive un-calibrated sensor in response to executing the at least one selected scenario.

11 Claims, 3 Drawing Sheets

(58) Field of Classification Search
USPC .......................................................... 702/104
See application file for complete search history.

(56) References Cited

U.S. PATENT DOCUMENTS

| | | | |
|---|---|---|---|
| 5,481,481 A | 1/1996 | Frey et al. | |
| 5,604,684 A | 2/1997 | Juntunen | |
| 6,798,341 B1 | 9/2004 | Eckel et al. | |
| 7,164,972 B2 | 1/2007 | Imhof et al. | |
| 8,131,399 B2 | 3/2012 | Ahmed | |
| 8,239,156 B2 | 8/2012 | Ekvall et al. | |
| 8,424,362 B2 | 4/2013 | Hajishah et al. | |
| 2002/0152792 A1 | 10/2002 | Wang et al. | |
| 2006/0267756 A1 | 11/2006 | Kates | |
| 2009/0132194 A1* | 5/2009 | Tischendorf | G01D 3/08 |
| | | | 702/104 |
| 2011/0264280 A1 | 10/2011 | Grabinger et al. | |
| 2013/0030745 A1* | 1/2013 | Laaksonen | G01R 33/0023 |
| | | | 702/85 |
| 2013/0282186 A1 | 10/2013 | Douglas et al. | |
| 2014/0012530 A1* | 1/2014 | Reinhold | G01N 27/4165 |
| | | | 702/104 |
| 2014/0092279 A1 | 4/2014 | Ovsiannikov | |

FOREIGN PATENT DOCUMENTS

| | | |
|---|---|---|
| WO | 9518357 A1 | 7/1995 |
| WO | 2013068873 A1 | 5/2013 |

OTHER PUBLICATIONS

International Search Report for PCT/2015/054591, dated Aug. 3, 2016, pp. 1-3.
Price et al. "Calibration and uncertainty analysis of temperature sensors [HVAC DDC system]" Slcon/01. Sensors for Industry Conference. Proceedings of the First ISA/IEEE. Sensors for Industry Conference, IEEE (Nov. 7, 2001) Abstract.

\* cited by examiner

HVAC SYSTEM INCLUDING ACTIVE SENSOR NETWORK CALIBRATION

CROSS REFERENCE TO RELATED APPLICATIONS

This application is a National Stage application of International Patent Application Serial No. PCT/US2015/054591, filed Oct. 8, 2015, which claims benefit to U.S. Provisional Application No. 62/062,386, filed Oct. 10, 2014, which are incorporated herein by reference in their entirety.

TECHNICAL FIELD

The present invention is generally related to heating, ventilation, and air conditioning (HVAC) systems, and more specifically, to calibration of a sensor network included in an HVAC system.

BACKGROUND

Un-calibrated HVAC sensors can cause a substantial increase in user discomfort and energy consumption (e.g., approximately 2%-4%). A conventional HVAC sensor network is typically calibrated manually as a part of an annual maintenance regime. Thus, conventional sensor calibration methods introduce high commissioning efforts and maintain poor sensor accuracy. Other conventional HVAC sensor calibration methods include fusing data from different sensors to estimate the real sensor reading such that the correlation between sensor readings is evaluated using learned building models. These models, however, require parameter tuning using trustable data sets. In this case, creating the models and obtaining the trusted data are the main challenges and require high commissioning cost.

SUMMARY

According to at least one exemplary embodiment, an active sensor calibration system includes a plurality of sensors configured to measure at least one physical quantity. Each sensor is configured to output a signal indicating at least one measured physical quantity. An electronic scenario library module is configured to store a plurality of scenarios. Each scenario is configured to excite two or more selected sensors among the plurality of sensors to generate redundancy among the selected sensors based on physical quantity models. An electronic calibration module is in signal communication with the plurality of sensors and the scenario library. The calibration module is configured to select at least one scenario from the scenario library module, determine at least one possible un-calibrated sensor among the plurality of sensors, and to identify a positive un-calibrated sensor in response to executing the at least one selected scenario.

BRIEF DESCRIPTION OF THE DRAWINGS

The subject matter which is regarded as the invention is particularly pointed out and distinctly claimed in the claims at the conclusion of the specification. The foregoing and other features of the invention are apparent from the following detailed description taken in conjunction with the accompanying drawings in which:

DETAILED DESCRIPTION OF THE INVENTION

Figure 1:
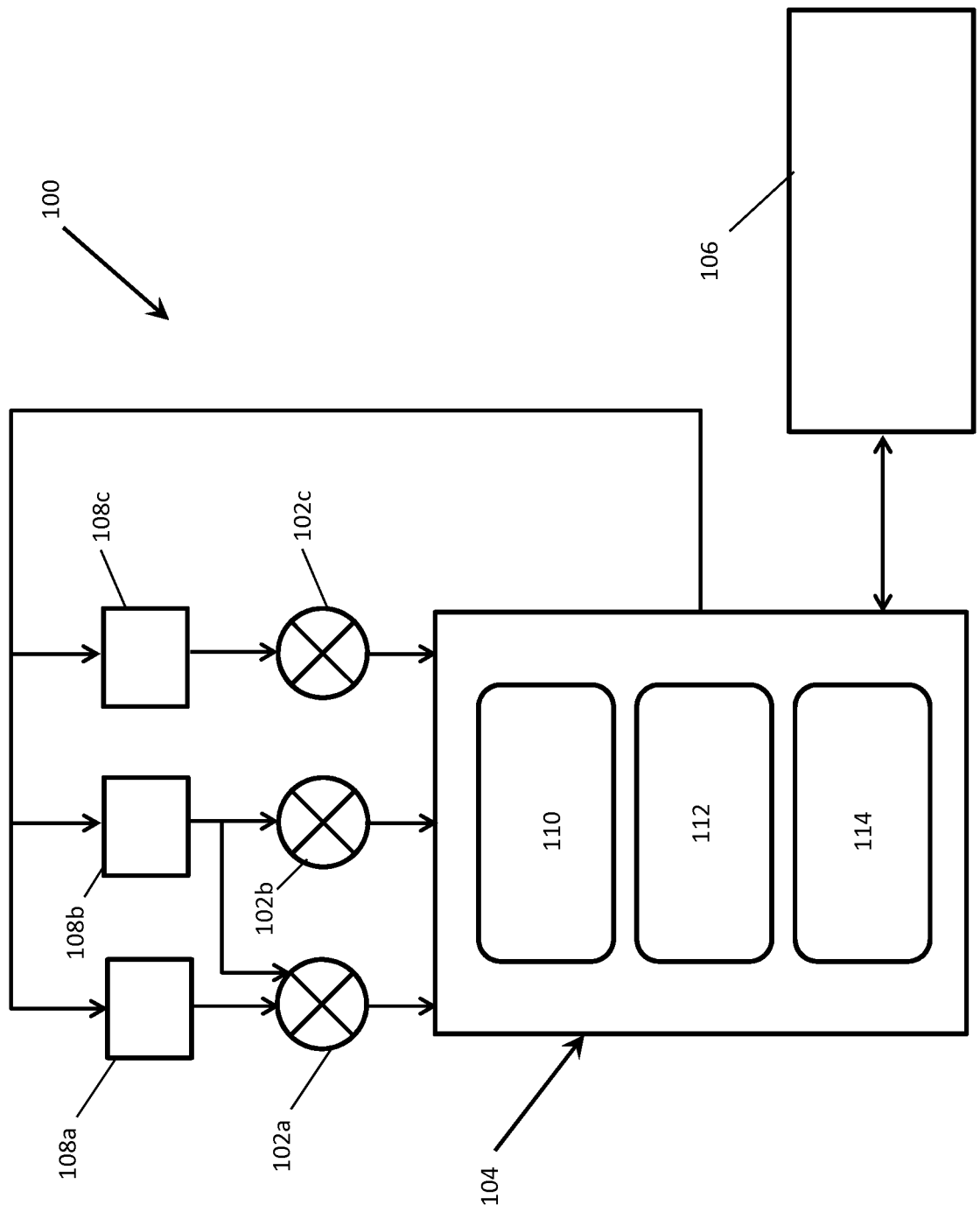
FIG. 1 is a block diagram illustrating an HVAC active sensor calibration system according to an embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an HVAC active sensor calibration system 100 is illustrated according to an embodiment. This calibration system 100 may be part of a building automation system or building management system. The HVAC active sensor calibration system 100 includes—two or more sensors 102a/102b/102c, an electronic calibration module 104, and an electronic scenario library module 106. The sensors 102a/102b/102c include various types of sensors configured to measure at least one physical quantity and output a signal indicating the at least one measured physical quantity. The physical quantity may include, but is not limited to, fluid temperature, fluid pressure, humidity, air temperature, airflow, air quality, and air pressure. The value of the fluid properties measured by each sensor 102a/102b/102c may be varied in response to initializing one or more actuators 108a/108b/108c that selectively delivers the physical quantity to the sensors 102a/102b/102c. For example, an actuator can be initiated such that air flow is delivered to sensor 102a and sensor 102b. In response to being excited by the air flow and/or water flow, the sensors 102a and 102b measure the temperature of the air flow and output a corresponding temperature signals indicating the air flow temperature.

According to an embodiment, the sensors 102a/102b/102c may be included in a common physical system such as, for example, a heating system, and may each measure a respective air flow temperature. According to another embodiment, the sensors 102a/102b/102c may be included in different respective physical systems. For example, the first sensor 102a may be included in a heating system, the second sensor 102b may be included in a fluid system, and a third sensor 102c may be included in a pressure system. In this manner, the first sensor 102a measures an air flow temperature, while the second sensor 102b measures a temperature of fluid such as, for example, flowing water, and the third sensor 102c measures air pressure.

The electronic calibration module 104 is in signal communication with the sensors 102a/102b/102c, the actuators 108a/108b/108c, and the electronic scenario library module 106. The electronic scenario library 106 includes a set of sensor models. A scenario is defined by a set of actuation commands over the set of actuators 108a/108b/108c, and a set of physical models over the physical quantities of the set of sensors 102a/102b/102c that hold during the respective set of actuation.

The scenarios are designed by expert knowledge and experimentation and are based on the system architecture, and other factors such as type of sensors and number of sensors included in the system (e.g., the HVAC system). Moreover, scenarios may be automatically generated/composed by the scenario library module 106 based on the topology of the HVAC system and sensor network in order to create redundancy among the sensors 102a/102b/102c with well characterized correlation. A sensor model defines the sensing specification of each type of sensor 102a/102b/102c in the system 100 under a healthy state (sensor is calibrated) and under an unhealthy state (sensor is uncalibrated) in terms of accuracy and reliability. The sensor models are specified based on a specification data sheet of the sensors 102a/102b/102c. Moreover, the administrator of the system 100 can add information about aging that can be taken into account to update the reliability of the sensors 102a/102b/102c.

According to an embodiment, the electronic calibration module 104 is configured to select one or more scenarios from the scenario library module 106, to initiate the actuators 108a/108b/108c based on the scenario actuation commands and collect physical quantities measured by the sensors 102a/102b/102c during the actuation and compute if sensors 102a/102b/102c are calibrated based on the sensor measurements, sensor models and scenario physical models. If uncalibrated sensors exist, the calibration module 104 attempts to unambiguously identify a unique set of uncalibrated sensors (more than possible set of uncalibrated sensors may exist that explain the sensor measurements, the scenario physical model and the sensor models). If the calibration module 104 cannot identify a unique set of uncalibrated sensors with the present sensor measurements, the calibration module 104 executes a sequence of scenarios, and thus the actuators 108a/108b/108c, to reduce ambiguity by isolating the possible sets of uncalibrated sensors.

Still referring to FIG. 1, the electronic calibration module 104 includes an electronic scenario execution unit 110, an electronic algorithm unit 112, and an electronic system identification unit 114. The electronic scenario execution module 110, for each of the scenarios from the library module 106 that are selected by the scenario identification unit 114, executes the selected scenario actuation commands. After executing the actuation commands of the corresponding scenario, it stores the physical quantities measured by the sensors 102a/102b/102c during the respective scenario actuation. The electronic algorithm unit 112 receives the physical quantities measured by the sensors 102a/102b/102c from the scenario execution unit 110, and the sensor models and physical models form the library module 106 for the scenarios selected by the scenario identification unit 114. The electronic algorithm unit 112 verifies if the sensors 102a/102b/102c are calibrated by checking if the measured physical quantities satisfy the corresponding scenarios physical model and the corresponding sensor models under healthy state (sensors are calibrated). If the sensors 102a/102b/102c are not calibrated, the algorithm unit 112 computes a possible set of uncalibrated sensors that explains the physical measurements through the scenario physical models and sensor models. If the algorithm unit 112 computes more than one set of possible uncalibrated sensors, the algorithm unit 112 requests more scenarios to be executed to unambiguously identify a unique set of uncalibrated sensors. Techniques such as, but not limited to, constraint optimization and inference in probabilistic graphical models can be used to compute a deterministic or probabilistic estimate of the state of the sensors and the sensor bias.

It is appreciated that different sensors may output different measurements, but still be considered calibrated based on their respective surrounding environment. For example, a first sensor disposed in first conduit having a first diameter may measure a first fluid pressure, while a second sensor disposed in a second conduit having a second diameter greater than the first diameter may measure a second fluid pressure different from the first pressure. However, the combination of the physical model and the sensor model may indicate that both sensors are outputting their expected measured quantity with respect to the diameter of their corresponding conduit. According to an embodiment, the electronic algorithm unit 112 will trigger an alert for the administrator to run the active calibration algorithm when one or more un-calibrated sensors are detected. The alert may include, but is not limited to, a sound alert, a visual alert, and a mobile device alert.

The electronic scenario identification unit 114 is in signal communication with the electronic algorithm unit 112. In response to receiving notification by an operator or other system that one or more un-calibrated sensors may exist (suspected uncalibrated sensors) or a notification from the algorithm unit 112 that a set of sensors might be uncalibrated but more scenarios are required to assess the true state of the set of sensors, the electronic scenario identification unit 114 identifies which physical systems contain those sensors and selects one or more scenarios from the electronic scenario library module 106 that correspond to the identified physical system. The electronic calibration module 104 then executes the active calibration algorithm based on the selected scenarios to identify one or more positive uncalibrated sensors among the sensors 102a/102b/102c.

The active calibration algorithm includes initializing one or more actuators 108a/108b/108c identified by the selected scenario with the intention of isolating and identifying one or more un-calibrated sensor. The initial set of scenarios may lead to no uncalibrated sensors found if the algorithm unit 112 verifies that all sensors are calibrated. In this case, the active calibration algorithm ends. According to an embodiment, if the algorithm unit 112 computes more than one set of possible uncalibrated sensors, a second scenario can be selected and the active calibration algorithm can be re-executed. The re-execution of the active calibration algorithm can be repeated multiple times using different scenarios until the positive un-calibrated sensor(s) are isolated and identified. When the positive un-calibrated sensor(s) are identified, the electronic calibration module 104 updates the sensor bias of the positive un-calibrated sensor(s). The un-calibrated sensor(s) bias is computed using the physical model, the sensor model and the measurements from the calibrated sensors. The sensor bias is added to the corresponding un-calibrated sensor(s) reading in the building management system (BMS) and stored in 110. Hence, any upcoming readings from the un-calibrated sensors are the sensor actual reading plus the corresponding bias.

Also, the electronic calibration module 104 can initiate the active calibration algorithm on a periodic (e.g. weekly, monthly, etc.) basis. In this manner, one or more suspected un-calibrated sensors can be detected without first determining a suspected un-calibrated sensor exists. Suspected uncalibrated sensors can be designated by an operator who suspects that a sensor is uncalibrated due to unusual or unexpected data from a building management system. Suspected uncalibrated sensors can also be designated by the calibration module monitoring the system (FIG. 3) when any of the scenarios in the library are executed during the normal operation of the system (operation 302) and the calibration module monitoring system computes that one or more sensors may be uncalibrated (operation 304). According to a non-limiting embodiment, at least one possible un-calibrated sensor is determined when a differential between a measured quantity and an expected quantity exceeds a threshold value.

Figure 2:
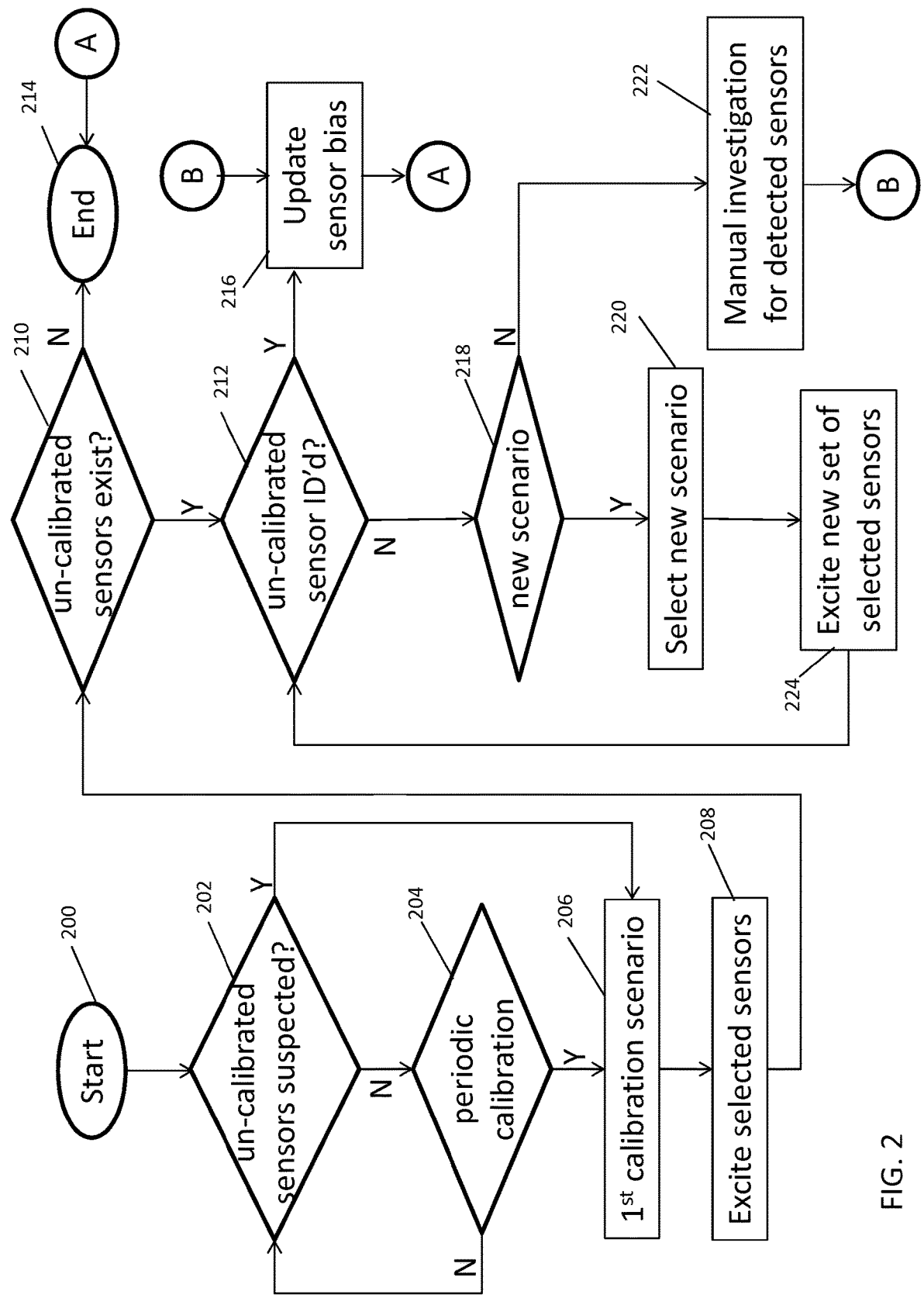
FIG. 2 is a flow diagram illustrating a method of actively calibrating at least one sensor installed in an HVAC system according to an embodiment.

Referring now to FIG. 2, a flow diagram illustrates a method of actively calibrating one or more sensors installed in an HVAC system according to an embodiment. The method begins at operation 200, and at operation 202 a determination is made as to whether one or more un-calibrated sensors exist. When there are no uncalibrated sensors are suspected at operation 202, a determination is made as to whether a periodic scheduled calibration event is initiated at operation 204. When a periodic calibration event is initiated or a suspected un-calibrated sensor exists, a first calibration scenario is executed at operation 206, as discussed in greater detail below. Otherwise, the system returns to operation 202 and continues monitoring for un-calibrated sensors.

At operation 206, a first calibration scenario the drives actuators to excite all the sensors in the corresponding system (in case calibration is triggered by a periodic calibration event) or to excite the suspected sensors (in case calibration is triggered by the existence of suspected sensors) are selected from a scenario library. At operation 208, the sensors are excited based on the first calibration scenario selected at operation 204. At operation 210, a determination is made as to whether one or more un-calibrated sensors are suspected in response to the first calibration scenario. When one or more un-calibrated sensor(s) are suspected, un-calibrated sensor(s) identification is determined at operation 212, otherwise the method ends at operation 214.

At operation 212, a determination is made as to whether an un-calibrated sensor(s) are identified. When un-calibrated sensor(s) are identified (i.e., positive un-calibrated sensor(s) are identified), the sensor(s) bias of the positive un-calibrated sensor(s) are updated at operation 216, and the method ends at operation 214.

When an un-calibrated sensor is not identified at operation 212, a determination is made as whether one or more new scenarios are available to excite the possible un-calibrated sensor(s) at operation 218. According to an embodiment, the new calibration scenario corresponds to a set of actuations to reduce ambiguity by isolating and identifying the possible un-calibrated sensors. When, there are new scenarios that excite the possible un-calibrated sensors, a new calibration scenario is selected at operation 220, otherwise a manual investigation for the possible un-calibrated sensors is requested at operation 222. At operation 224, the set of possible un-calibrated sensors is excited based on the new calibration scenario, and the method returns to operation 212 to determine if an un-calibrated sensor(s) are identified. When un-calibrated sensor(s) are still not identified, the method continues checking/selecting a new scenario and/or a new set of possible sensors at operations 218-220. When, however, an un-calibrated sensor(s) are identified (i.e., positive un-calibrated sensor(s) are identified) at operation 212, the bias of the identified positive un-calibrated sensor(s) are updated at operation 216, and the method ends at operation 214. At operation 222, a manual identification of the positive un-calibrated sensor(s) is performed among the detected sensors and the sensor(s) bias of the positive un-calibrated sensor(s) are updated at operation 216, and the method ends at operation 214.

Figure 3:
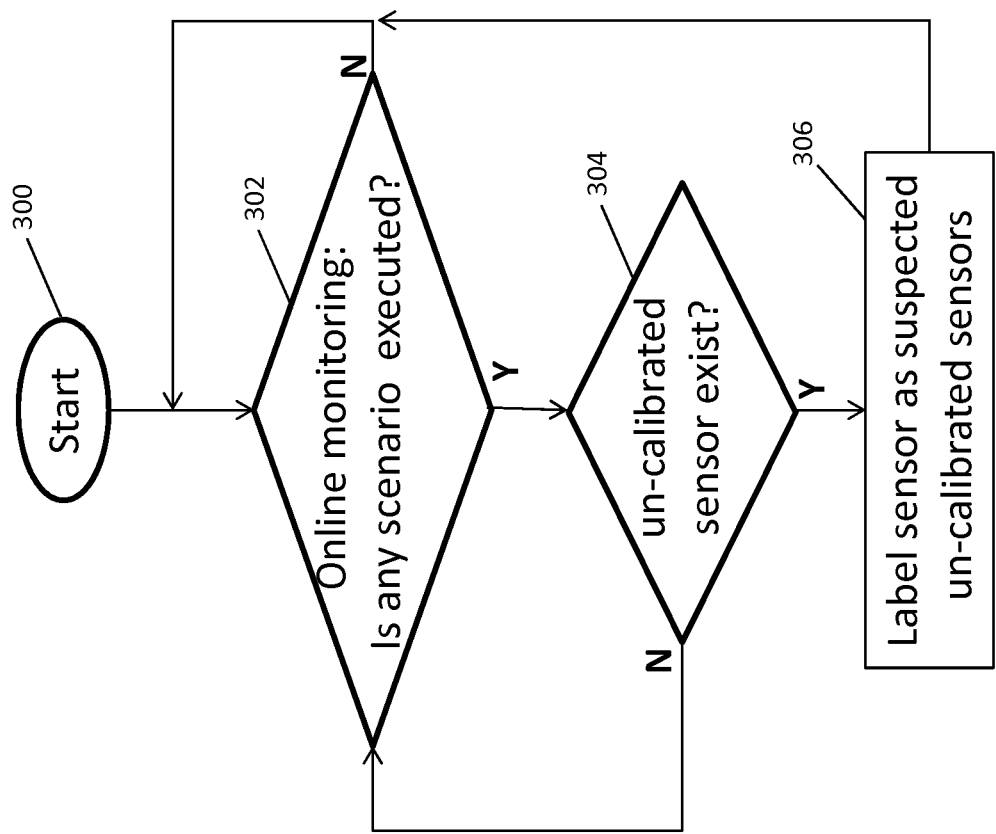
FIG. 3 is a flow diagram illustrating a method of actively calibrating at least one sensor installed in an HVAC system according to another embodiment.

Turning now to FIG. 3, a flow diagram illustrates a method of online monitoring un-calibrated sensors according to a non-limiting embodiment. The method begins at operation 300, and at operation 302 a determination is made as to whether one or more scenarios are executed. When no scenarios are executed, the method returns to operation 302 and continues to determine whether a scenario is executed. Otherwise, a determination is made as to whether one or more un-calibrated sensors exist at operation 304. When no un-calibrated sensors exist, the method returns to operation 302 and continues determining of scenarios are executed. When, however, one or more un-calibrated sensors exist, the existing sensor is labeled as a suspected un-calibrated sensor at operation 306, and the method returns to operation 302 to continue monitor for executed scenarios. It is appreciated that one or more operations illustrated in FIG. 3 may be implemented in FIG. 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments or a combination of the embodiments described. For example, operations in different flow charts may be combined to provide for a combination of the features illustrated therein. Accordingly, the invention is not to be seen as limited by the foregoing description, but is only limited by the scope of the appended claims.

The invention claimed is:

1. An active sensor calibration system, comprising:
    a plurality of sensors configured to measure at least one physical quantity, each sensor configured to output a signal indicating a respective measured physical quantity;
    an electronic scenario library module configured to generate at least one scenario, the at least one scenario configured to excite at least one selected sensor among the plurality of sensors; and
    an electronic calibration module in signal communication with the plurality of sensors and the electronic scenario library, the electronic calibration module configured to select the at least one scenario from the electronic scenario library module, to determine a physical system that includes at least one possible un-calibrated sensor among the plurality of sensors, and to identify a positive un-calibrated sensor in response to executing the at least one selected scenario,
    wherein the electronic calibration module determines the at least one possible un-calibrated sensor based on a comparison between a measured quantity output by the plurality of sensors and an expected quantity, and
    wherein the electronic calibration module further comprises:
        an electronic scenario execution unit configured to determine the expected quantity of the plurality of sensors based on at least one of a sensor model corresponding to a respective sensor and a physical model identifying the relation between the measurement of the respective sensor and at least one of the measurements of the rest of the sensors; and an electronic algorithm unit that receives an electrical measurement signal from the electronic scenario execution unit indicating the measured quantity, compares the measured quantity and the expected quantity, and determines the at least one possible un-calibrated sensor exists when a differential between the measured quantity and the expected quantity exceeds a threshold value.

2. The active sensor calibration system of claim 1, wherein the electronic calibration module updates a bias of the at least one positive un-calibrated sensor.

3. The active sensor calibration system of claim 1, wherein the electronic calibration module further comprises an electronic system identification unit that determines the physical system including the at least one possible un-calibrated sensor based on at least one scenario selected from the electronic scenario library module.

4. The active sensor calibration system of claim 3, further comprising a plurality of actuators that excite a respective plurality of sensors, wherein the electronic calibration module initiates a set of actuators based on the selected scenario such that the respective sensors generate a respective measured quantity.

5. The active sensor calibration system of claim 4, wherein the electronic calibration module continues selecting different scenarios until at least one positive un-calibrated sensor is identified.

6. The active sensor calibration system of claim 5, wherein a newly selected different scenario is selected based on a result of a previous scenario.

7. The active sensor calibration system of claim 6, wherein the plurality of sensors are installed in a heating, ventilation and cooling (HVAC) system.

8. A method of actively calibrating at least one sensor, the method comprising:

measuring at least one physical quantity;

storing a plurality of scenarios, each scenario configured to excite at least one selected sensor among a plurality of sensors; and selecting at least one scenario from the electronic scenario library module;

determining a physical system that includes at least one possible un-calibrated sensor among the plurality of sensors based on a comparison between a measured quantity output by the plurality of sensors and an expected quantity, the expected quantity of the plurality of sensors determined based on at least one of a sensor model corresponding to a respective sensor and a physical model corresponding to the measurement of the respective plurality of sensors;

comparing the measured quantity and the expected quantity; and determining the at least one possible un-calibrated sensor exists when a differential between the measured quantity and the expected quantity exceeds a threshold value; and identifying a positive un-calibrated sensor in response to executing the at least one selected scenario.

9. The method of claim 8, further comprising updating a bias of the at least one positive un-calibrated sensor.

10. The method of claim 9, further comprising determining the physical system that includes at least one possible un-calibrated sensor based on at least one scenario selected from the electronic scenario library module.

11. The method of claim 10, further comprising repeatedly selecting different scenarios until at least one positive un-calibrated sensor is identified, wherein a newly selected different scenario is selected based on a result of a previous scenario.

* * * * *